United States Patent [19]
Ramrath

[11] 3,795,012
[45] Feb. 26, 1974

[54] FAR SIDE PLOTTER

[75] Inventor: Frank A. Ramrath, Needham, Mass.

[73] Assignee: Massachusetts Institute of Technology, Cambridge, Mass.

[22] Filed: May 31, 1972

[21] Appl. No.: 258,154

[52] U.S. Cl............... 346/76 R, 160/380, 346/134
[51] Int. Cl....................... G01d 9/40, G01d 15/10
[58] Field of Search......... 346/76, 77, 108, 134, 29; 95/1 LP, 1 R, 12; 250/65 T; 178/94; 101/415.1, 127.1; 160/378, 380; 33/1 M; 355/75

[56] References Cited
UNITED STATES PATENTS

| 706,743 | 8/1902 | Fessenden..................... 346/108 UX |
| 1,597,487 | 8/1926 | St. Clair.............................. 346/108 |
| 1,875,048 | 8/1932 | Levene........................... 346/108 X |
| 2,109,109 | 2/1938 | Finch........................... 346/76 R X |
| 2,566,247 | 8/1951 | Pierce et al.......................... 33/1 M |
| 2,959,096 | 11/1960 | Bobeck et al................... 160/378 X |
| 3,149,900 | 9/1964 | VanHorne et al................... 346/17 |
| 3,223,029 | 12/1965 | Simshauser..................... 346/141 X |
| 3,268,907 | 8/1966 | Parrish............................ 346/76 X |
| 3,392,402 | 7/1968 | Hartai................................ 346/31 |

Primary Examiner—Joseph W. Hartary
Attorney, Agent, or Firm—Arthur A. Smith, Jr.; Robert Shaw

[57] ABSTRACT

Data plotting and display apparatus incorporating a light-passing thermally sensitive recording sheet diaphragmatically supported in the recording field of a positionally controlled thermal stylus. The stylus is provided with means for directing a beam of light on the sheet for visibility on the non-contacted side of the sheet to indicate stylus position in the recording field. The light beam preferably originates from a light bulb that also provides the source of heat for thermal plotting on the recording sheet.

7 Claims, 10 Drawing Figures

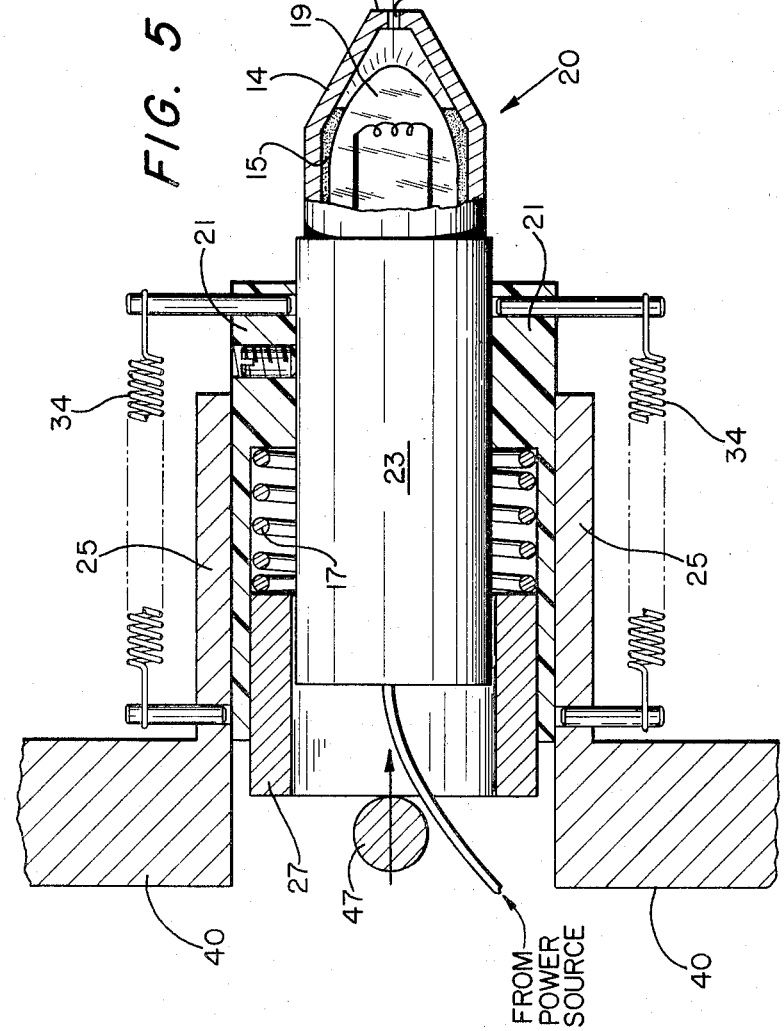

FAR SIDE PLOTTER

The invention described herein was made in the course of a contract with the Department of the Navy.

BACKGROUND OF THE INVENTION

This invention relates generally to data plotters and displays, and particularly to improvements in the viewability of plotted information and of the recording stylus.

Data plotting and display apparatus has a variety of uses for registering and displaying information concerning some measured quantity of an object. Typically, such measures are derived by instruments and converted by an electronic unit into coordinates of a recording field of a recorder. A stylus plots the data on a recording medium occupying the field. An example of such apparatus, and which provides a convenient context for describing the principles and advantages of the invention, is a positional or X-Y recorder. It plots and displays positional information along a spatial X-Y coordinate system of a recording medium. An analog mechanism provides transport means for locating the stylus in the recording field according to signals received from an electronic unit characterizing coodinates to be plotted say to display the movement of an object. The electronic unit includes computing apparatus that processes information received from position measuring instruments.

Normally, certain features are sought of such data plotting and display apparatus. It is desireable to have a clear view of the recording medium so that all points are plainly visible and to afford easy access for hand notations. Simultaneously, it is preferred to have a continuous indication of the position of the stylus in the recording field apart from the data points plotted. An unexpected irregularity in stylus position, for instance when it runs off scale, may signal equipment malfunction. An indication of stylus location is also helpful in "zeroing" and calibrating the equipment. A view of the stylus may not be available where recording is on a translucent or opaque medium from the far side (opposite the viewing side) so as to provide an unobstructed view of the data plotted, or difficult where recording is performed in a darkened room. Moreover, it may be desirable to have the recording medium in sheet form so that it may be conveniently stored for future reference in a ring-binder. It may also be preferred to have the sheet adequately supported without the back-up of a supporting plate between it and the recording stylus.

Of these features, there are known recorders and displays that offer a clear view of the recording medium. Inkless recorders of the thermal, optical or inscribing type accommodate far side plotting. For example, the Patent of Halpern, U.S. Pat. No. 2,474,312 discloses a thermal stylus with a heating element embodied in a cavity in the head of the stylus, the stylus being suited for the far side recording on a heat sensitive film. The Patent of Behrmann, U.S. Pat. No. 2,930,668 discloses a positional indicator utilizing ultraviolet light beams optically directed through a transparent back-up plate supporting a suitably sensitized paper for far side plotting. Apparatus is also known for mechanically inscribing points on the far side of a glass or acrylic recording plate having a translucent or opaque layer.

OBJECTS

It is an object of the invention to provide improved data plotting and display equipment.

It is another object to provide recording and display apparatus affording the far-side plotting on a recording sheet without the intervention of a back-up plate.

It is yet another object to provide an improved stylus of simple construction and incorporating recording and display apparatus affording a continuous indication of stylus position.

SUMMARY OF INVENTION

These and other objects are met by plotting and display apparatus utilizing a thermally sensitized, preferably light-passing sheet as a recording medium in the recording field of a thermal stylus. Framing means are provided for holding the sheet taut with sufficient elastic stiffness to maintain the sheet in the recording field upon repeated contact by the stylus. The stylus is equipped with means for directing a narrow beam of light on the recording sheet to indicate its position from the far side of the sheet. The light source is unified with the heating means of the stylus and preferably embodied in an incandescent light bulb.

DRAWINGS

FIG. 2A is is a sectional view of the recording sheet of FIG. 2 along the cut 2A.

FIG. 5 is a cross-sectional view of the improved stylus and its seating relationship in the transport means of FIGS. 1 and 3.

FIG. 5A is a view of the stylus head along contacting axis 10a of FIG. 5, and FIG. 5 B is a view along the same axis of an alternative embodiment of the head.

DETAILED DESCRIPTION

Figure 1:
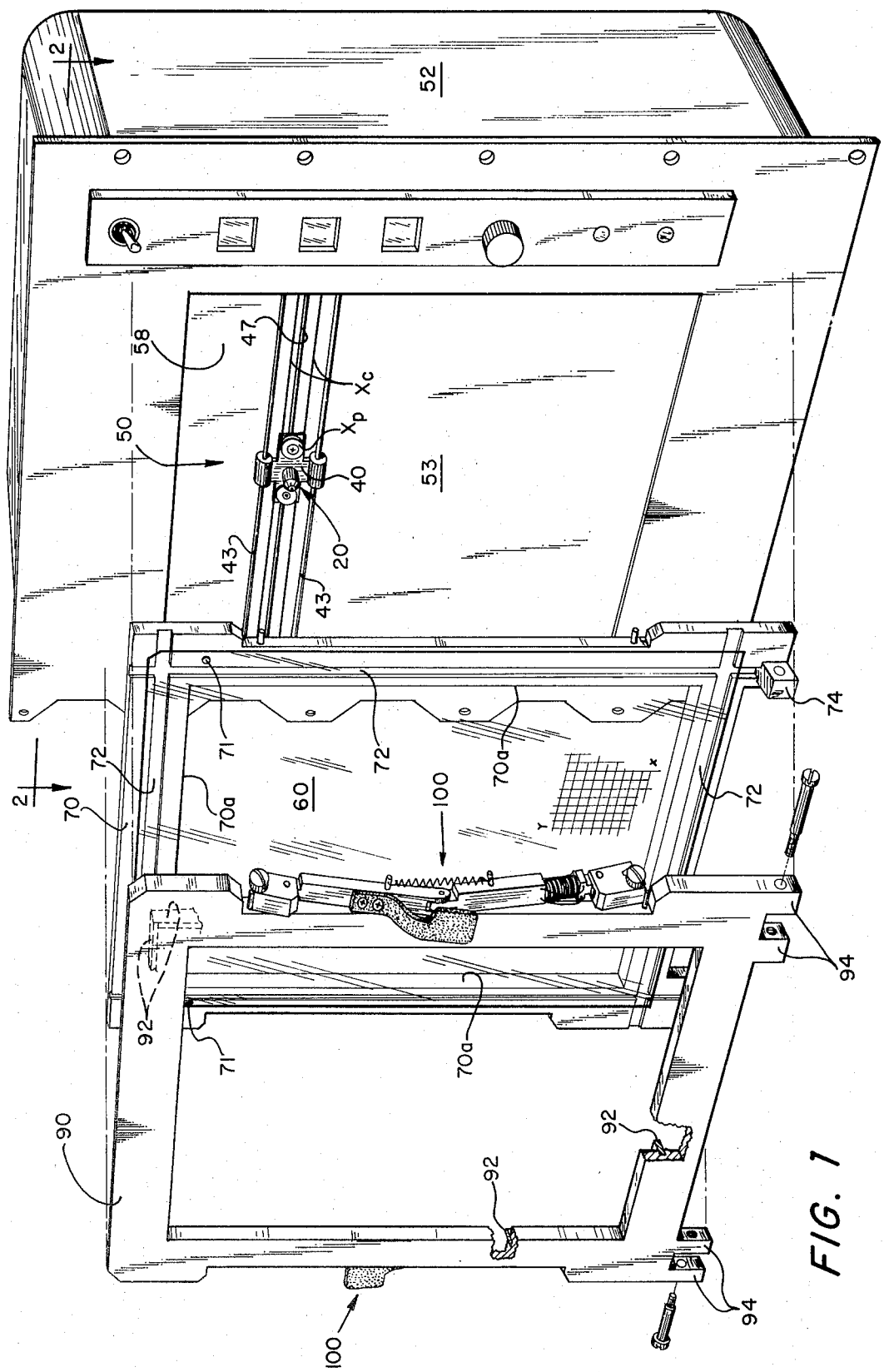
FIG. 1 is an exploded diagramatic view of X-Y recording and display apparatus in perspective embodying the principles of the invention.

A perspective is first taken of the general features of the X-Y plotting apparatus of FIGS. 1-3A. Illustrated in FIG. 1 is X-Y transport means, generally designated 50, for the contact positioning of thermal stylus 20 in a recording field occupied by a recording medium, thermally sensitized sheet 60. Transport means 50 is supported on a base mounted within chassis 52, and includes carriage 40 holding stylus 20 in the foreground of electroluminescent lighting panel 58. Transport means 50 is more fully illustrated in later FIG. 3. Recording sheet 60 has a thermally sensitive film that experiences distinctive marks when momentarily contacted by heated stylus 20. It is supported within casement 70-90 which supplies means for framing the sheet taut in the recording field. Fixed frame 70 of the casement is secured to the face of chassis 52, while clamping frame 90 is pivotally mounted on frame 70 by hinge elements 74-94. Sheet 60 is properly located on frame 70 with the aid of convenient guides, such as a pair of index pins 71. Portions of sheet 60 cover grooves 72 just outside inner rim 70a of frame 70, the rim 70a providing the border for the recording area of sheet or apparatus.

Figure 2:
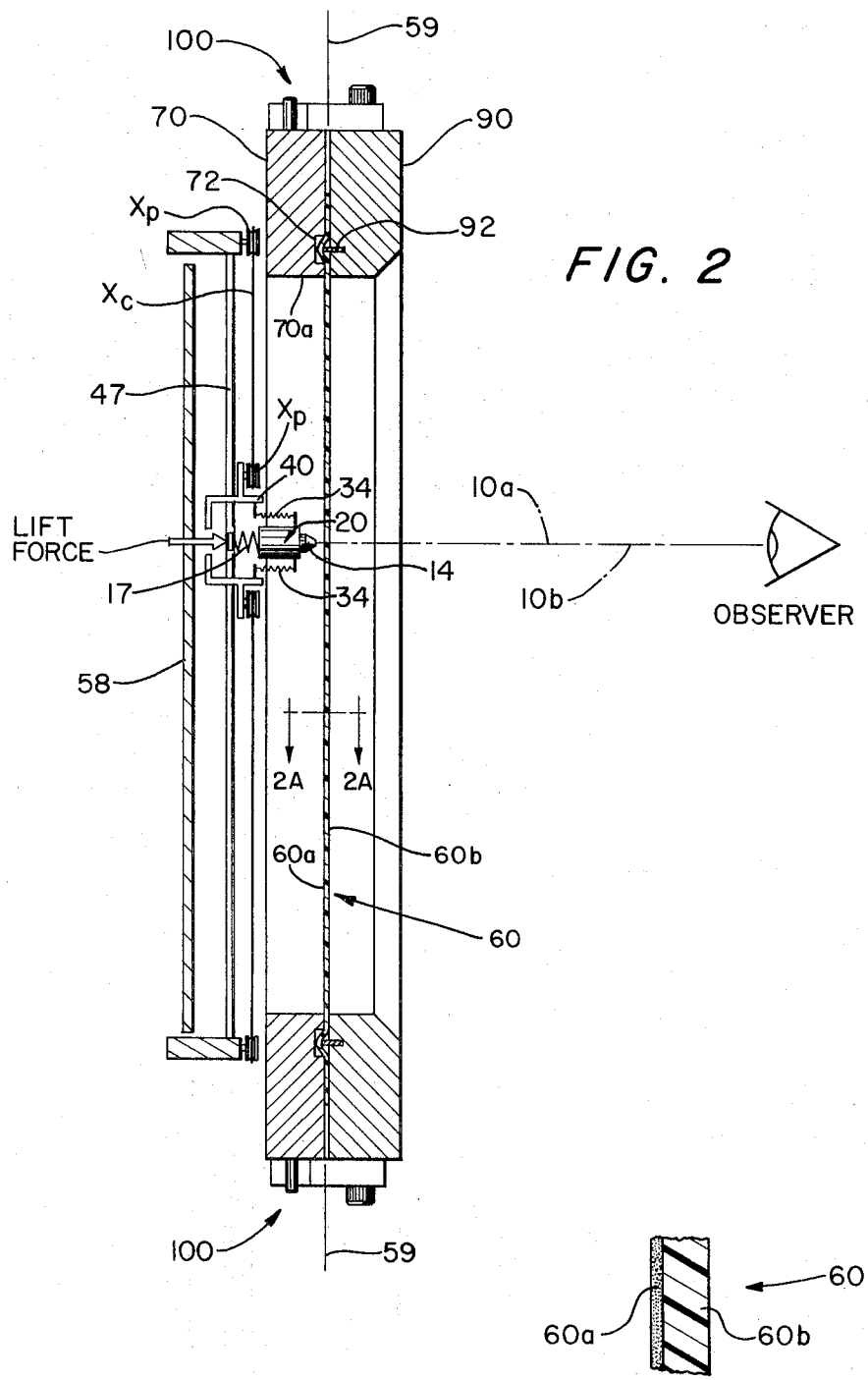
FIG. 2 is a diagramatic cross-sectional view of the apparatus of FIG. 1 upon assembly and along the cut 2—2 of FIG. 1, illustrating the structural relationship between principal components.

With the aid of FIG. 2, it is seen that clamping frame 90 has protruding ribs 92 matching with and entering grooves 72 of fixed frame 70 when the casement is closed and clamped by manual depression of the handles of toggle clamps 100. The features of toggle clamp 100 as well as its clamping relationship with frames 70 and 90 is detailed in conjunction with later FIGS. 4 and 4A. Upon their entry, ribs 92 draw overlaying portions of recording sheet 60 partially into the grooves. Grooves 72 and matching ribs 92 are proportioned so as to make sheet 60 taut in the recording with slight diaphragmatic characteristics similar to those in the tightly stretched membrane or head of a musical drum. The diaphragmatic streeses induced in sheet 60 remove latent sagging and unevenness in the recording area of the sheet, and further introduce sufficient elastic stiffness along contacting axis 10a of stylus 20 so as to minimize axial deflection from the recording field, represented by plane 59 of FIG. 2, and to assure return to that field upon repeated contact of stylus 20.

Referring to FIGS. 1, 2 and 2A, stylus 20 is equipped with means for directing a narrow beam of light 10b for incidence on sheet 60 so as to be visible to an observer on the far side thereof, the beam preferably coinciding with contacting axis 10a. The light source is preferably combined with the structure of the heating means of the stylus. The stylus is lifted from its seat in carriage 40 by lift rod 47 of a lifting mechanism of transport means 50 for momentary contact with sheet 60 so as to make a visible mark on thermal sensitive film 60a on carrier 60b. The lift force is depicted by the arrow of FIG. 2 acting through loading spring 17. Upon release of the lift force, the stylus is returned to its seat by the action of retraction springs 34. These features of the stylus and its construction are again discussed in connection with later FIG. 5.

Figure 3:
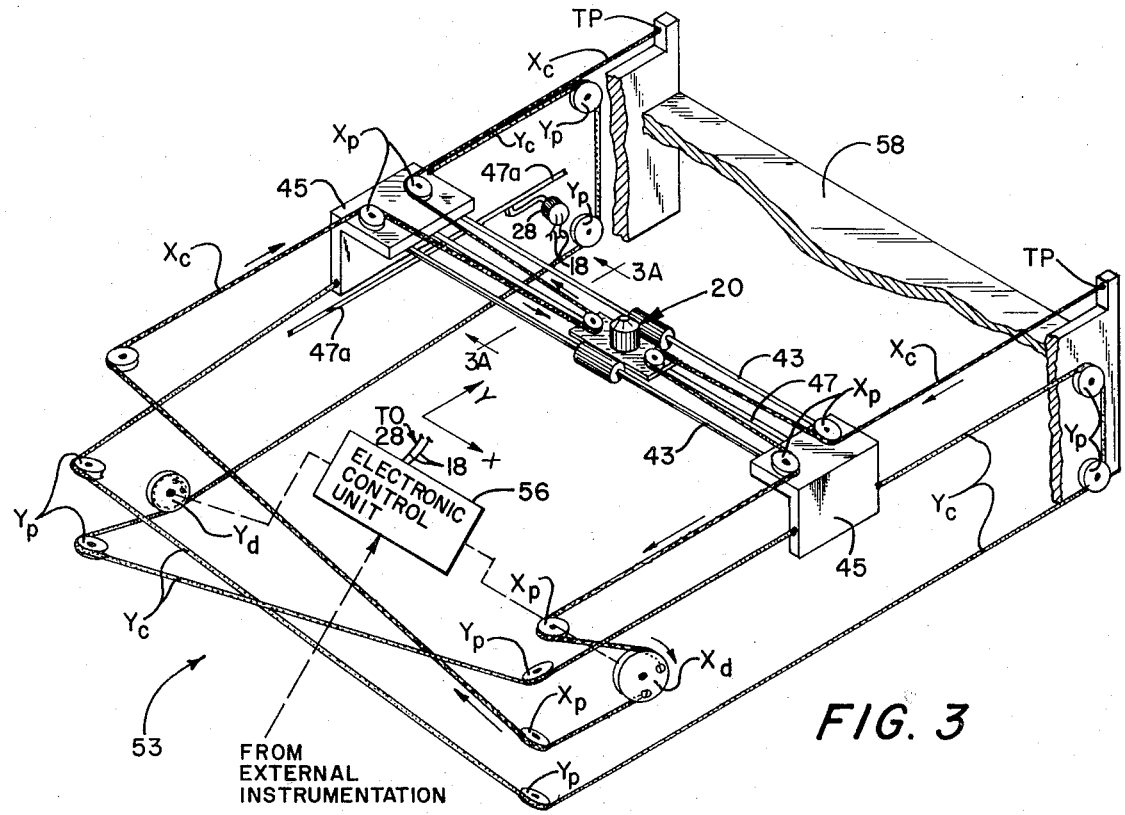
FIG. 3 illustrates diagramatically the transport means for the contact positioning of the stylus incorporated in the apparatus of FIG. 1.

Referring now to FIG. 3, servo-controlled X and Y axes pulley systems are illustrated in transport means 50 for moving carriage 40 parallel to the recording field. X-axis pulley system has two cables, $xc$, each with one end anchored to X-drive drum $xd$, and the other end connected to one of tie posts $tp$. The cables $xc$ are directed through a plurality of X pulley wheels, $xp$'s, rotatably mounted on carriage 40 and base 53. X-axis drive is initiated by signals from electronic unit 56 activating X-drive drum, $xd$, the signals characterizing the X ordinate of the recording field to be plotted. Upon X-axis drive, carriage 40 slides along guide rods 43 mounted across transport frames 45, the sense of drive and cable movement illustrated by arrows. Similarly, Y-axis movement is achieved through Y-axis pulley system comprising cable $yc$ organized through pulley wheels $yp$'s, with the ends of cable $yc$ anchored to Y-axis drive drum $yd$, and cable $yc$ driving transport frames 45 in the Y-direction. Drive drum $yd$ is coupled to electronic unit 56 and is responsive to signals therefrom characterizing the Y-ordinate of the point to be plotted.

Figure 3A:
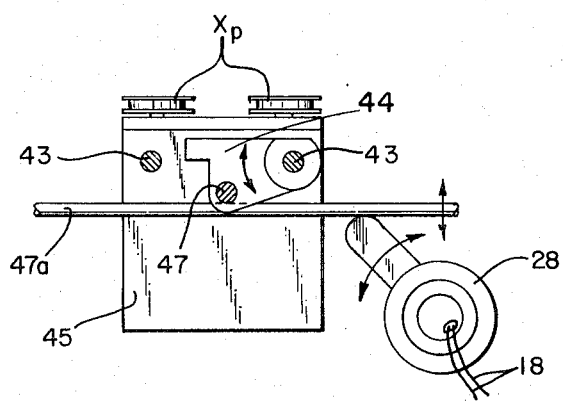
FIG. 3A is a diagramatic view along the cut 3A of FIG. 3 illustrating features of the lift mechanism for the stylus.

The lifting mechanism for stylus 20 is better appreciated with the aid of FIG. 3A. Base mounted rotary solenoid 28 is shown for acting upon lift rods 47a and 47, the latter being mounted on pivoting brackets 44 of transport frames 45. Bracket 44 is mounted on one of guide rods 43 which in turn is bearing mounted on frames 45. Solenoid 28 is activated by time controlled lift signals coupled by cable 18 from unit 56 when a point is to be registered on sheet, with stylus 20 being lifted for contact by lift rod 47.

THE LOCKING CLAMPS

Figure 4A:
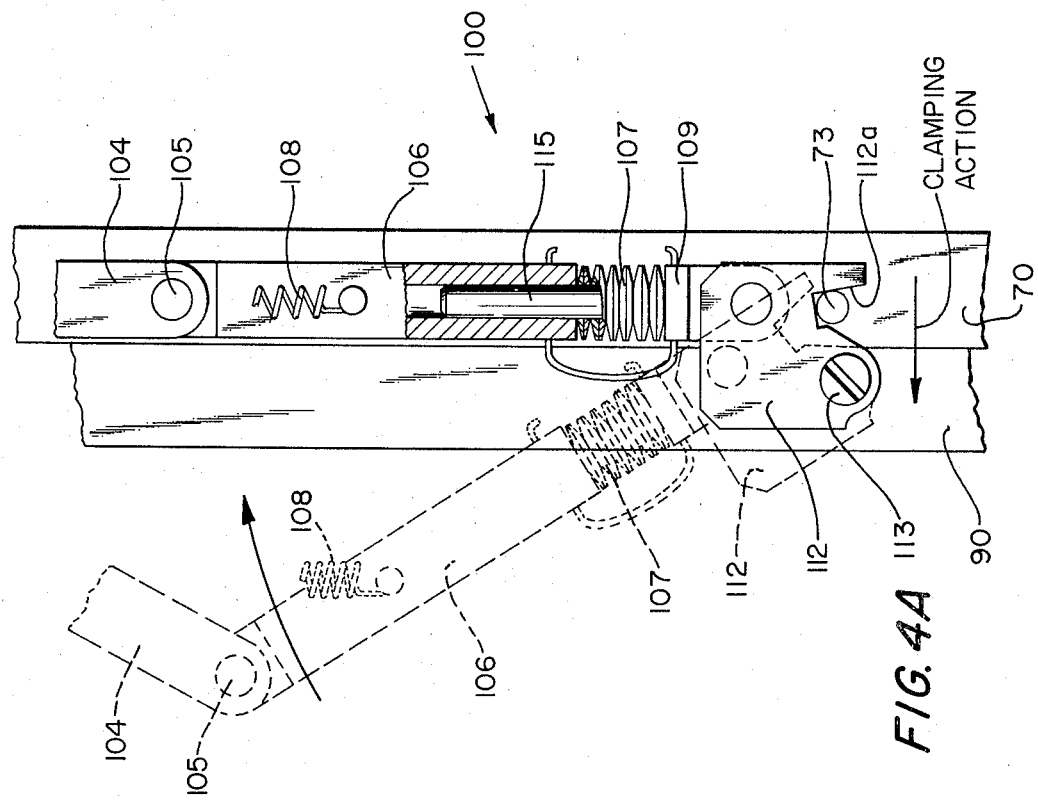
FIG. 4A is a fragmentary view of a portion of a toggle clamp of FIG. 4 depicting the force actions in clamping the frame tightly closed.
Figure 4:
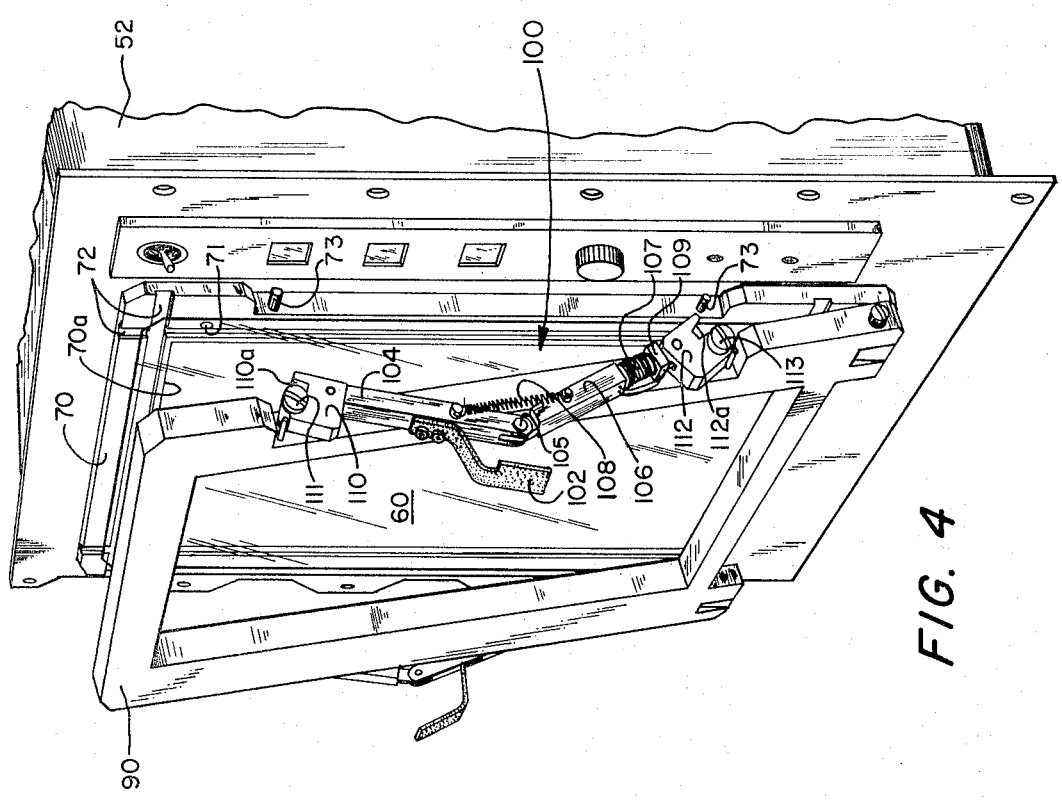
FIG. 4 is a partial perspective view of the apparatus of FIG. 1 particularizing additional features of the sheet supporting frame, the frame being shown partially open.

Detailed features of clamps 100 and their locking arrangement with the casement are illustrated in FIGS. 4 and 4A. In FIG. 4, clamping frame 90 is shown partially open with recording sheet 60 ready for clamping, being mounted on index pins 71 of frame 70 and overlaying grooves 72, as was previously described. The near one of clamps 100 is shown with two arms 104 and 106 pivotally joined by locking pin 105 and retraction spring 108 located under handle 102. The arms are mechanically linked with locking jaws 110 and 112 pivoting about pins 111 and 113, with arm 106 being coupled by telescoping means of telescoping rod 115 and plunger 109 allowing translational flexibility of jaw 112 along arm 106. Bellville springs 107 are provided to limit the force of arm 106 upon jaw 112. Lower lips 110a and 112a of the jaws are slightly inclined surfaces positioned to slide forceably under corresponding latch pins 73 extending from the sides of frame 70 when the casement is closed and handle 102 is depressed causing arms 104 and 106 to be straightly aligned. The forced interaction between lips 110a and 112a and pins 73 introduces a tight clamping effect between frames 70 and 90 thereby inducing diaphragmatic stresses in clamped sheet 60. The effect of springs 107 is to limit the clamping force upon latch pins 73. The clamping action is depicted by the force arrows of FIG. 4A where one arm of clamp 100 is shown moving from its open position to its fully extended or locked position, the positions illustrated in dashed and solid lines, respectively.

THE RECORDING SHEET

Recording sheet 60 may be of the type that is opaque becoming translucent or transparent upon heated contact of stylus 20, but is preferably light-passing so as to pass enough of light beam 10b of FIG. 2 to be seen on the non-contacted side of the sheet. Sheet carrier 60b also is sufficiently strong so as to yield the sought diaphragmatic properties when clamped by the casement. Hypothetically, some paper and plastic sheets known in the graphic and reproduction arts offer such characteristics. Such qualities, for instance, are described for some polyester films, such as the product poly(ethylene terephthalate) sold under the trademark MYLAR of DuPont for engineering, reproduction and graphic arts applications (See, Encyclopedia of Polymer Science and Technology, Vol. 11 Interscience Publishers, John Wiley and Sons, Inc., (1969) pages 42, 49). MYLAR film also offers dimensional stability, a property sought in instrumentation applications, and is tough enough to withstand wear and allow hand notations to be made on the sheet without tearing under normal conditions. Similarly, suitable heat sensitive films that yield visibly contrasting images upon reaching a conversion temperature through localized heating seem available in the thermo-reproduction art, some of which is exemplified by the Patents of Owen, U.S. Pat. No. 2,910,377; of Grant, U.S. Pat. No. 3,080,254; and of Wingert, U.S. Pat. No. 3,031,329.

Preferred recording sheet qualities were found in transparent overlay projection sheets of the type used in the thermographic reproduction of graphic images and prints sold under the trade description "Transparency Film, Infra-red, Type 577" by the 3M Company. These demonstrated suitable diaphragmatic properties and seemed well conditioned for handling and against wear and chemical attack. Good contrasting qualities between markings and the transparent surface of the sheet were demonstrated upon contact of a thermal stylus heated at a temperature of about 130°C and for a duration of about 0.3 seconds.

For present purposes, carriers with a thickness of not more than 0.01 inches are suggested for workability. A minimum thickness of the thermal sensitive layer is thought desirable to reduce the conversion time of contacted points and to reduce particle residues accompanying conversion. A preferred carrier may be translucent or transparent, but the former may be more desirable where it is sought to mask the view of the stylus and transport means structures.

THE STYLUS

The construction of the stylus and its mounting with carriage 40 is illustrated in FIG. 5. Stylus 20 comprises base member 21 slideably seated in ring 25 fixed to carriage 40, base member 21 fixedly holding ferrule 23 for miniature incandescent light bulb 19, an example of which may be Industrial Standard Type TL-1¾ manufactured by the Chicage Miniature Lamp Works under catalogue number CM 20-3. Spring 17 is selected to suitably limit the force of the stylus on the recording sheet and occupies the recess between member 21 and lift bushing 27. Bushing 27 contacts lift rod 47 of transport means 50. A thermal conducting head 14 of copper, silver or like thermal conductors is provided with a cavity for fitting over bulb 19. It captures the radiated energy of the light bulb and directs it toward contacting tip 13. Head 14 is of narrow cross-section to reduce its mass and warm-up time. The head is secured to bulb 19 by a suitable resilient adhesive 15, such as of silicone rubber, that is heat resistant and sufficiently resilient to accommodate dimensional adjustments between bulb 19 and head 14 accompanying heating. A bore 11 between the cavity and plotting tip 13 of the head provides a channel for communicating a narrow beam of light from the bulb. The bore preferably coincides with the contacting axis 10a of the stylus. However, as is illustrated in an alternative embodiment of FIG. 5B, it may be located elsewhere at or near plotting tip 13 to show stylus position, as is apparent, and more than one bore may be provided. In FIG. 5B, two beams 10b are shown channeled through holes 11. Although head 14 and bulb 19 are illustrated as separate components secured by adhesive 15, they may be otherwise secured or be manufactured within a unified structure to gain the advantages described.

Operationally, the stylus is advanced from its retracted position of FIG. 5 by the action of lift rod 47 against lift bushing 27 according to the operation discussed in conjunction with FIGS. 3–3A. The lift force is transmitted through spring 17 to slide base member 21 and thus thermal head 14 forward into contact with the recording sheet. After sufficient contact of head 14, the stylus is returned to its seat in ring 25 upon release of lift rod 47 and the action of retraction springs 34.

While the principles and advantages of the present invention have beem exemplified in the embodiment of the described X-Y plotting and display apparatus, obviously they may apply to other forms of recording and display apparatus and equipment therefor with variations from the preferred embodiments herein stated.

What is claimed is:

1. In combination with thermal plotting and display apparatus having a stylus with heating means for plotting points on a thermally sensitive film and with means for the contact positioning of said stylus with a recording field and along a contacting axis, the improvement comprising:

a recording sheet occupying said field, said sheet being adapted to pass light and having a heat sensitive film on a first side yielding visibly distinct points when contacted by said heated stylus;

means within said heating means for emitting a beam of light incident on said sheet so as to indicate the position of said stylus from a second side of said sheet; and means coupled to said apparatus for framing said sheet sufficiently taut in said recording field so as to allow said first side of said sheet to be contacted by said stylus and so as to produce sufficient stiffness along said contacting axis for returning said sheet to said field upon its deflection therefrom upon said contact by said stylus.

2. Thermal plotting and display apparatus in accord with claim 1 wherein said framing means comprises a first frame mounted on said apparatus having an inner rim and grooves just outside said rim, said first frame supporting said sheet with said sheet overlaying said grooves, and a clamping frame having protruding ribs matched for entry into said grooves whereupon said entry said ribs draw said overlaying portions of said sheet into said grooves sufficiently to produce said tautness in said sheet, and means for clamping said frames together to cause said entry of said ribs into said grooves.

3. Thermal plotting and display apparatus as set out in claim 2 wherein said sheet has a carrier of poly(ethylene terepthalate) material.

4. In combination with data recording and display apparatus having a plotting stylus and means for the contact positioning of said stylus with a recording field within the recording area of said apparatus according to coordinates to be plotted, the improvement comprising;

framing means with an inner border defining said recording area, said framing means for holding a recording sheet taut in said recording field so as to yield sufficient diaphragmatic characteristics in said sheet as to maintain said sheet in said field upon repeated contact by said stylus, and wherein said stylus includes means for directing a beam of light on said sheet so as to be visible through said recording area.

5. Data recording and display apparatus as set forth in claim 4 wherein said framing means comprises a first frame mounted on said apparatus with an inner rim and grooves outside said rim, and a second frame mounted on said first frame and having ribs matched for partial entry into said grooves of said first frame, and means for clamping said frames together to cause said ribs to enter said grooves.

6. Data recording and display apparatus as defined in claim 5 wherein said clamping means comprises first and second pairs of latch pins mounted on opposite sides of said first frame and a pair of locking clamps mounted on said second frame so that each mechanically communicates with a latch pin pair, each clamp comprising first and second pivotally joined arms each mechanically linked with a locking jaw pivotally mounted on said second frame, each jaw having an inclined lip for forceably sliding under one of said pins of said communicating latch pin pair, said first arm being linked with its corresponding jaw through telescoping means allowing translational flexibility of said jaw along said arm and including a spring for limiting the force of said first arm against said corresponding jaw upon said translation, said locking clamp being positioned on said second frame with relation to said latch pin pair of said first frame so that the depression of said pivotal junction of said first and second arms causes said arms to be substantially straightly aligned, said jaws pivoting and forcing said inclined lips to slide under said latch pin pair thereby clamping said first and second frames together.

7. A clamping frame for tautly supporting a recording sheet in the recording field of a recorder comprising;
a first frame having an inner rim and grooves outside said rim,
a second frame adapted for mounting on said first frame and including protruding ribs matched for partial entry into said grooves upon said mounting of said second frame on said first frame,
first and second pairs of latch pins mounted on opposite sides of said first frame,
a pair of locking clamps mounted on said second frame so that each communicates mechanically with one of said first and second pairs of latch pins of said first frame, and wherein each of said clamps comprises,
first and second pivotally joined arms each arm mechanically linked with a locking jaw pivotally mounted on said second frame, each jaw having an inclined lip for forceably sliding under one of said pins of said communicating pair of latch pins, said first arm being linked with its corresponding jaw through telescoping means allowing translation of said jaw along said first arm and including a spring for coupling and limiting the force of said first arm upon said jaw upon said translation, said locking clamp being positioned with relation to said communicating latch pin pair so that the depression of said pivotal junction of said first and second arms causes said arms to move into straight alignment with said jaws pivoting and forcing said inclined lips to slide under said latch pin pair thereby clamping said first and second frames together.

* * * * *